S. ZELAZO.
TROLLEY WHEEL.
APPLICATION FILED OCT. 29, 1919.
1,368,006.
Patented Feb. 8, 1921.
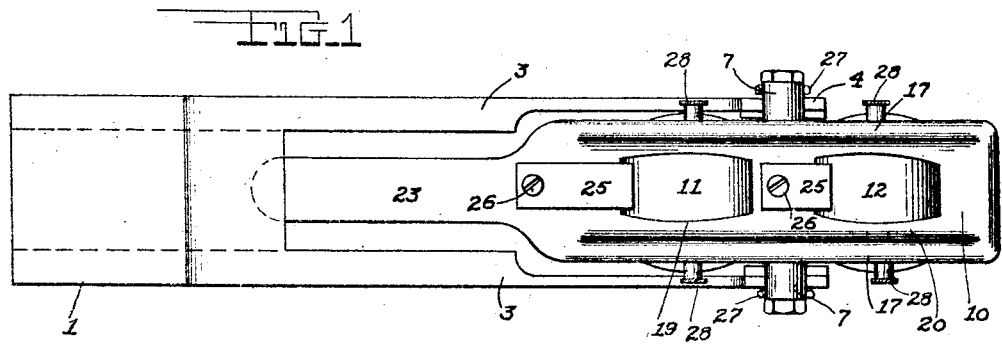
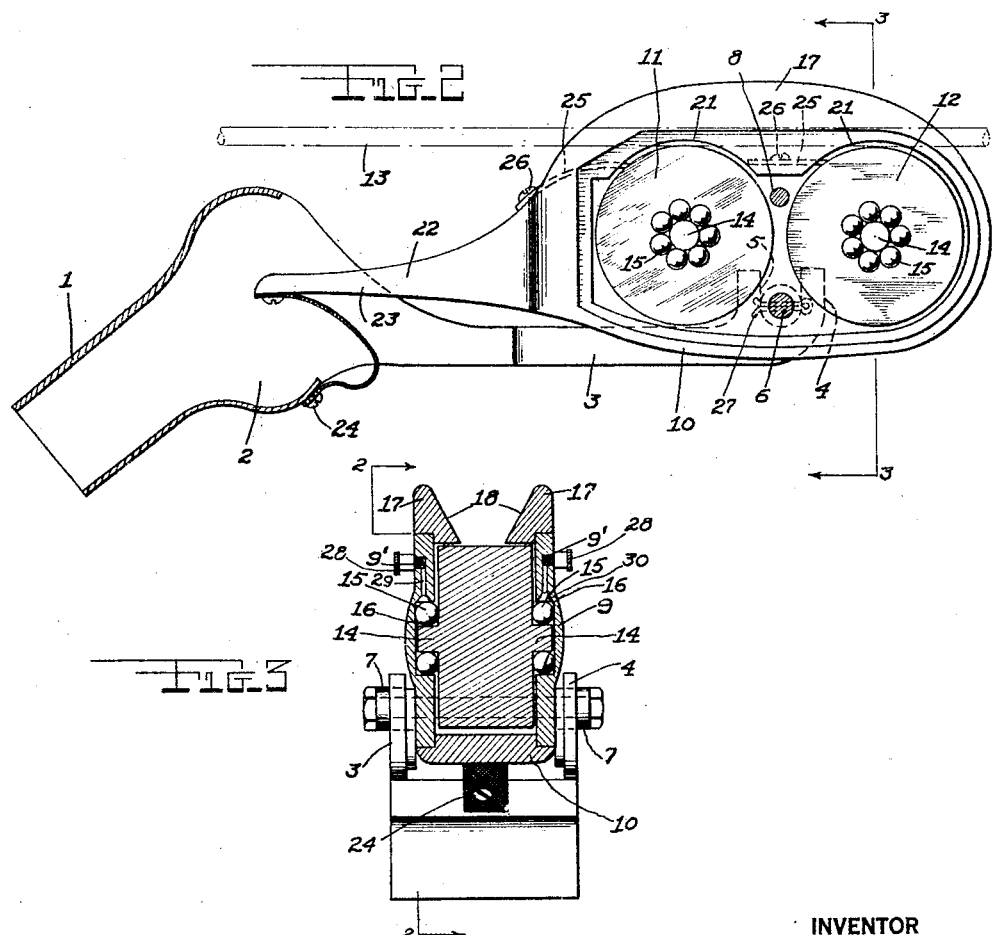
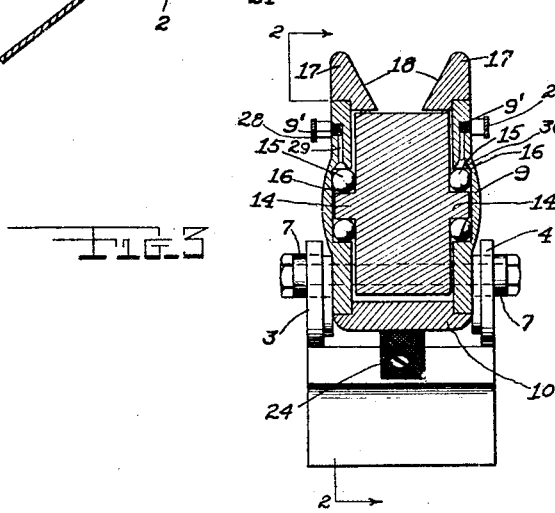
INVENTOR
Stanley Zelazo
BY
ATTORNEY

UNITED STATES PATENT OFFICE.

STANLEY ZELAZO, OF ADAMS, MASSACHUSETTS.

TROLLEY-WHEEL.

1,368,006.  Specification of Letters Patent.  Patented Feb. 8, 1921.

Application filed October 29, 1919. Serial No. 334,249.

*To all whom it may concern:*

Be it known that I, STANLEY ZELAZO, a citizen of the United States, residing at Adams, county of Berkshire, and State of Massachusetts, have invented certain new and useful Improvements in Trolley-Wheels, of which the following is a specification.

This invention relates to trolley wheels such as are used to travel along overhead trolley wires to transmit the electric current to the car on which the trolley wheel is mounted.

The invention has for an object to provide a novel construction for a trolley wheel in which wear on the bearings is reduced to a minimum and which also acts to lessen the liability of the wheel jumping from the trolley wire while running along the latter.

For further comprehension of the invention, and of the objects and advantages thereof, reference will be had to the following description and accompanying drawings, and to the appended claims in which the various novel features of the invention are more particularly set forth.

Figure 1 of the drawings is a plan view of a trolley wheel constructed according to my invention.

Fig. 2 is a longitudinal section thereof, this view being taken on the line 2—2 of Fig. 3.

Fig. 3 is a transverse section on the line 3—3 of Fig. 2.

In the drawings 1 represents a hollow bracket which may be suitably fitted upon the upper end of an ordinary trolley pole, the upper end of this bracket being vertically expanded as at 2 to form a chamber for a purpose to be later set forth. Projecting rearwardly from opposite sides of the bracket is a pair of arms 3, having upturned ends 4, slotted downwardly as at 5 to receive and support a bolt 6, the latter having collars 7 thereon which engage in the slots 5. A second bolt 8 extends between the side-plates to secure the latter in place.

This bolt 6 pivotally supports a wheel carrying frame comprising a pair of cheek-plates 9 through which the bolt passes and which plates are fixed in suitable recesses in the side walls of a hollow casting 10 of approximately elliptical shape which casting forms the peripheral member of the frame. Within this casting 10, and between the cheek-plates 9, is mounted a pair of contact making wheels 11 and 12 which engage the trolley wire 13, these wheels having integral trunnions 14 which are supported by ball bearings 15 in runways formed by recessing the inner faces of the plates as indicated at 16.

The top wall of the casting 10 is extended upwardly at its sides in the form of longitudinal ribs 17 which provide guides for the trolley wire 13, the inner faces of these ribs sloping downwardly and inwardly as at 18 toward the wheels. The latter project through centrally located apertures 19 and 20 in the top wall of the casting which is also cut out under the ribs 17 as indicated at 21 to bring the upper faces of the wheels above the level of the central part of such top wall so that the trolley wire will be spaced thereabove when engaged by the wheels.

Formed integrally with the casting is a tail 22 which projects into the chamber 2 and has secured thereto one end of a flexible electrical connection member 23 whose opposite end is secured as at 24 under the bracket. The bolt 6 before mentioned, is located between the contact wheels 11 and 12 so that the upward pressure of the pole will act to cause both wheels to press evenly upon the trolley wire, the various parts being so arranged that when the trolley pole is at a normal angle the arms 3 extend horizontally, while the tail 23 is substantially midway between top and bottom of the chamber 2, the top and bottom walls of the latter limiting the movement of the tail.

It will be apparent of course that the wheel frame will shift on its pivot to accommodate variations in the height of the trolley wire above the car and keep both wheels in contact with the wire. The interior of the frame is preferably filled with oil while a pair of flat spring members 25 are secured by screws 26 on the top of casting 10 and bear against the surfaces of the wheels to prevent the oil being carried upward by the rotation of the wheel. As shown in Fig. 3. screw plugs 28 close oil or lubricating openings 9' in the cheek-plates 9, and the lubricating agent introduced through the openings flows through channels 29 and openings 30 into the runways 16 allowing a lubrication of the bearings 15.

A cotter pin 27 as shown in Fig. 2 secures the trolley wheel frame in place between the upturned ends of the arms 3.

Having thus described my invention what I claim as new and desire to secure by Letters Patent, is—

1. A frame for trolley wheels of the character described comprising in combination, a casting having centrally located apertures in its top, longitudinal ribs extending upwardly from said casting to form guides for the trolley wire, the trolley wheels extending through the apertures of said casting in engagement with the trolley wire, a tail-piece formed integrally with said casting, means for supporting said tail-piece for pressing the trolley wheels against the trolley wire and means bearing against the upper faces of the trolley wheels for closing the apertures in the top of said casting.

2. In a frame for trolley wheels of the character described, the combination of a casting providing a lubricating chamber having centrally located apertures in its top, with a pair of trolley wheels extending through the apertures in the top of said casting, ball bearings formed in runways in the side walls of said casting, tenons for said trolley wheels supported by said ball bearings, a pair of longitudinal ribs extending upwardly from said casting and having inner downwardly sloping faces to form a guide for the trolley wire, a tail piece on said frame, means for elastically supporting one end of said tail piece to press said trolley wheels evenly against the trolley wire, and means bearing on the upper faces of said trolley wheels for closing the apertures in the top of said casting.

3. A frame for trolley wheels of the character described, comprising in combination, a hollow casting having centrally located apertures in its top, longitudinal ribs extending upwardly from said casting to form guides for the trolley wire, the trolley wheels extending through the apertures in the top of said casting in engagement with the trolley wire, a tail piece formed with said casting, a spring adapted to engage a bracket at the upper end of a trolley pole for supporting said tail piece and holding the trolley wheels evenly against the trolley wire, and a pair of flat spring members secured to the top of said casting bearing against the upper faces of said trolley wheels, for closing the apertures in the top of said casting.

In testimony whereof I have affixed my signature.

STANLEY ZELAZO.